United States Patent
Raiskin

(10) Patent No.: US 11,347,931 B2
(45) Date of Patent: *May 31, 2022

(54) PROCESS FOR CREATING A FIXED LENGTH REPRESENTATION OF A VARIABLE LENGTH INPUT

(71) Applicant: PAYPAL, INC., San Jose, CA (US)

(72) Inventor: Yarden Raiskin, Tel Aviv (IL)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/087,041

(22) Filed: Nov. 2, 2020

(65) Prior Publication Data
US 2021/0081598 A1 Mar. 18, 2021

Related U.S. Application Data

(63) Continuation of application No. 16/378,522, filed on Apr. 8, 2019, now Pat. No. 10,824,794.

(51) Int. Cl.
*G06F 40/143* (2020.01)
*G06F 40/14* (2020.01)
(Continued)

(52) U.S. Cl.
CPC ............ *G06F 40/14* (2020.01); *G06F 16/951* (2019.01); *G06F 40/143* (2020.01);
(Continued)

(58) Field of Classification Search
CPC ...... G06F 40/14; G06F 40/143; G06F 40/146; G06F 40/166; G06F 16/951; G06N 3/08; G06Q 30/0641
See application file for complete search history.

(56) References Cited

U.S. PATENT DOCUMENTS 4,593,267 A 6/1986 Kuroda et al.
9,799,327 B1 10/2017 Chan et al.
(Continued)

FOREIGN PATENT DOCUMENTS

CN 105302884 A 2/2016

OTHER PUBLICATIONS

Kello et al. "Using simple recurrent networks to learn fixed-length representations of variable-length strings." In: Proceedings of the AAAI Symposium on Compositional Connectionism 2004 (2004) Retrieved on Jul. 26, 2020 (Jul. 26, 2020) from <https://www.aaai.org/Papers/Symposia/Fall/2004/FS-04-03/FS04-03-0 08.pdf> entire document.

*Primary Examiner* — Keith D Bloomquist
(74) *Attorney, Agent, or Firm* — Haynes and Boone, LLP

(57) ABSTRACT

A computer system identifies that a first portion of markup language, extracted from a markup language document of a website, corresponds to a first actionable element, wherein the first portion of markup language is a variable length representation. In response to identifying that the first portion of markup language corresponds to the first actionable element, the computer system utilizes a recurrent neural network (RNN) encoder to create a first code representation that corresponds to the first portion of markup language. The computer system identifies a first additional information that corresponds to one or more pre-defined goals. The computer system creates a final fixed length markup language representation that includes the first code representation and the first additional information. The computer system inputs the final fixed length markup language representation into a model.

20 Claims, 8 Drawing Sheets

(51) Int. Cl.
  *G06N 3/08*  (2006.01)
  *G06F 16/951*  (2019.01)
  *G06F 40/146*  (2020.01)
  *G06F 40/166*  (2020.01)
  *G06Q 30/06*  (2012.01)

(52) U.S. Cl.
  CPC .......... *G06F 40/146* (2020.01); *G06F 40/166* (2020.01); *G06N 3/08* (2013.01); *G06Q 30/0641* (2013.01)

(56) References Cited

U.S. PATENT DOCUMENTS

| | | | |
|---|---|---|---|
| 10,084,779 | B2 | 9/2018 | Hunt et al. |
| 2002/0143521 | A1 | 10/2002 | Call |
| 2008/0114739 | A1* | 5/2008 | Hayes .................. G06F 16/951 |
| 2009/0217154 | A1* | 8/2009 | Chowdhury .......... G06F 40/143 |
| | | | 715/234 |
| 2012/0023073 | A1 | 1/2012 | Dean et al. |
| 2014/0149849 | A1 | 5/2014 | Dasari et al. |
| 2015/0212791 | A1 | 7/2015 | Kumar et al. |
| 2017/0371017 | A1 | 12/2017 | Odry et al. |
| 2018/0121392 | A1 | 5/2018 | Zhang et al. |
| 2019/0087747 | A1 | 3/2019 | Kapoor et al. |
| 2019/0122258 | A1 | 4/2019 | Bramberger et al. |

* cited by examiner

| 502 | 504 | 506 |
|---|---|---|
| Original input | Processed Input | Output (Input Reconstruction) |
| <a class="blue2roll contextlink" href="https://www.writing.com/view/2155984">planting stones</a> | <START><a class="blue<DIGIT>roll contextlink" href="<SITE>view/<DIGIT><DIGIT><DIGIT><DIGIT><DIGIT><DIGIT>">planting stones</a><END><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD> | <START><a class="blue<DIGIT><DIGIT>oll contextiink" href="<SITE>vpee/<DIGIT><DIGIT><DIGIT><DIGIT><DIGIT><DIGIT><DIGIT>">pplnnnnnnnnesss</a><END><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD> |
| <a href="http://www.sonyaltdstore.com/pins-lizard/">pins: lizard</a> | <START><a href="<SITE>pins-lizard/">pins: lizard</a><END><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD> | <START><a href="<SITE>piisalizzzr/">pins: lizadd</a><END><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD><PAD> |

PROCESS FOR CREATING A FIXED LENGTH REPRESENTATION OF A VARIABLE LENGTH INPUT

CROSS REFERENCE TO RELATED APPLICATION

This application is a continuation of and claims priority to U.S. patent application Ser. No. 16/378,522, filed Apr. 8, 2019, which is incorporated by reference herein in its entirety.

TECHNICAL FIELD

The present disclosure relates to autoencoders, and more particularly to a training and utilizing an autoencoder to create a fixed length representation of a variable length input.

BACKGROUND

The web represents a large source of data that is utilized by many companies in developing meaningful insights for the purposes of risk assessment, marketing, as well as other business purposes. In many cases, companies rely on machine learning algorithms to extract these meaningful insights from data that has been collected. However, machine learning algorithms typically require data to be input in a structured manner, and therefore, it can be problematic to utilize data obtained from the web as input for machine learning algorithms, since a website's content is represented as HTML, which is text-based syntax, notorious for being unstructured and of variable length. It would be beneficial to create a solution that readily and easily allows for the utilization of web data as input for machine learning algorithms.

BRIEF DESCRIPTION OF THE DRAWINGS

FIG. 5 is a depiction of specific iterations of the process of training the autoencoder of FIG. 1, in accordance with an embodiment.

DETAILED DESCRIPTION

Figure 1:
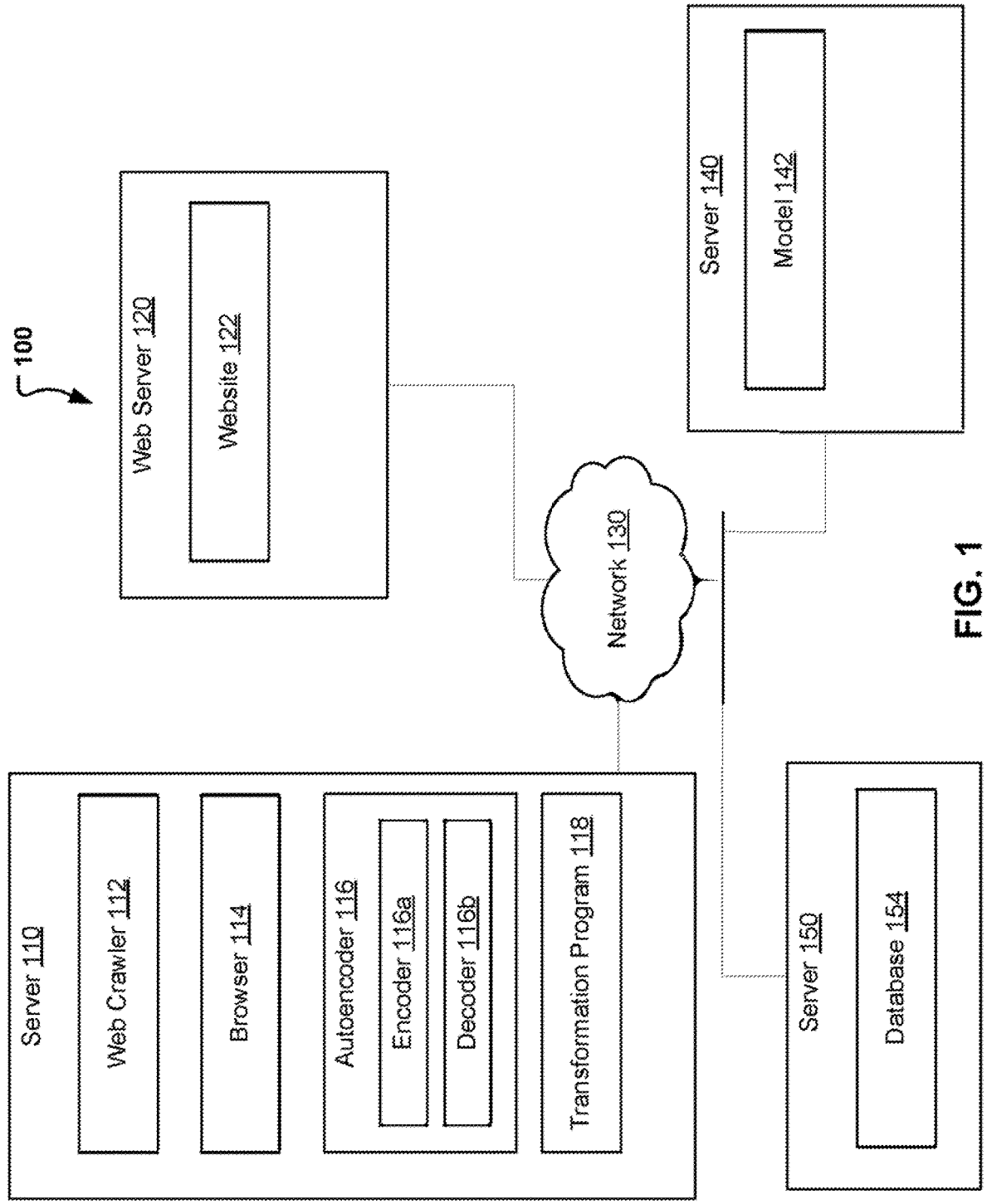
FIG. 1 illustrates an autoencoder system, in accordance with an embodiment.

Embodiments of the present disclosure provide a system, method, and program product. A computer system identifies that a first portion of markup language, extracted from a markup language document of a website, corresponds to a first actionable element, wherein the first portion of markup language is a variable length representation. In response to identifying that the first portion of markup language corresponds to the first actionable element, the computer system utilizes a recurrent neural network (RNN) encoder to create a first code representation that corresponds to the first portion of markup language. The computer system identifies a first additional information that corresponds to one or more pre-defined goals. The computer system creates a final fixed length markup language representation that includes the first code representation and the first additional information. The computer system inputs the final fixed length markup language representation into a model.

Furthermore, in response to identifying a first portion of markup language corresponds to a first actionable element, a computer system creates a first embedded token sequence that corresponds to the first portion of markup language. In response to creating the first embedded token sequence, the computer system utilizes a recurrent neural network (RNN) encoder to create a first code representation that corresponds to the first embedded token sequence. The computer system inputs the first code representation into an RNN decoder and receives a first output. The computer system determines a loss value by comparing the probability vectors output by the RNN decoder (or a corresponding output token sequence) to the first embedded token sequence. Based on the determined loss value, the computer system adjusts one or more weight values associated with the RNN encoder.

In the example embodiment, the present disclosure describes a solution that describes a process for training a Recurrent Neural Network (RNN) autoencoder to output a fixed length markup language representation from an input of a variable length markup language snippet, in accordance with an embodiment. The present disclosure describes a solution that includes utilizing a web crawler to identify an actionable element within markup language (such as hypertext markup language (HTML) or extensible markup language (XML)), and further creating a token sequence corresponding to the actionable element. The present disclosure describes creating an embedding for the token sequence, and additionally, inputting the embedded tokens through an RNN encoder to create a code representation of the actionable element. The present disclosure then describes inputting the code representation of the actionable element into the RNN decoder and determining a series of probability vectors (one corresponding to each token of a desired token sequence). Furthermore, the present disclosure describes determined an output token sequence from the series of probability vectors, and additionally determining if there is a convergence between the output embedded token sequence and the input embedded token sequence. The present disclosure further describes comparing the probability vectors (or the corresponding output embedded token sequence) to a desired embedded token sequence to identify a loss value (when compared to a desired output), and additionally, updating weights associated with the RNN autoencoder. The process may be repeated and the weights may continue to be adjusted accordingly until there is a convergence between the output of the RNN decoder and the input of the RNN encoder.

Furthermore, the present disclosure also describes a process for utilizing a trained RNN encoder to output a fixed length markup language representation from an input of a variable length markup language snippet, in accordance with an embodiment. In the example embodiment, the present disclosure identifies an actionable element within a markup language (such as HTML or XML), and further, pre-processes the markup language (as described above) and utilizes an RNN encoder to create a fixed language markup language representation of the actionable element. Furthermore, the present disclosure describes identifying additional information corresponding to the actionable element and utilizing the additional information (if available) to create a final fixed length markup language representation of the actionable element. Furthermore, the present disclosure describes inputting the fixed length markup language representation into a model, such as a machine learning model, and obtaining an output.

As stated above, machine learning algorithms typically require data to be input in a structured manner, and therefore, it may be problematics to use data obtained from the web as input for machine learning. The present disclosure describes a process that leverages the power of RNN to process sequential data, as well as the power of autoencoders to reproduce an input from a short code to produce an RNN encoder for sequences. As described below, with respect to the figures, utilizing a trained RNN encoder can be utilized to create a fixed length representation of an HTML snippet (thus creating a mapping between a variable length HTML code and a fix-length vector representation). Embodiments of the present disclosure will now be described in detail with reference to the accompanying Figures.

FIG. 1 illustrates autoencoder system 100, in accordance with an embodiment. In the example embodiment, autoencoder system 100 includes server 110, web server 120, server 140, and server 150 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a Bluetooth network, a local area network (LAN), or a wide area network (WAN). In general, network 130 can be any combination of connections and protocols that will support communications between computing devices, such as between server 110 and server 140.

In the example embodiment, web server 120 includes website 122. In the example embodiment, web server 120 may be a desktop computer, a laptop computer, a tablet computer, a mobile device, a handheld device, a thin client, or any other electronic device or computing system capable of receiving and sending data to and from other computing devices, such as server 110, via network 130. Although not shown, optionally, web server 120 can comprise a cluster of servers executing the same software to collectively process requests as distributed by a front-end server and a load balancer. In the example embodiment, web server 120 is a computing device that is optimized for the support of websites that reside on web server 120, such as website 122, and for the support of network requests related to websites, which reside on web server 120. Web Server 120 is described in more detail with regard to the figures.

In the example embodiment, website 122 is a collection of files including, for example, HTML files, CSS files, image files and JavaScript files. Website 122 may also include other resource files such as audio files and video files. Website 122 is described in more detail with regard to the figures.

In the example embodiment, server 140 includes model 142. In the example embodiment, server 140 may be a desktop computer, a laptop computer, a tablet computer, a mobile device, a handheld device, a thin client, or any other electronic device or computing system capable of receiving and sending data to and from other computing devices, such as server 110, via network 130. Furthermore, in the example embodiment, server 140 is a computing device that is optimized for the support of programs that reside on server 140, such as model 142. Although not shown, optionally, server 140 can comprise a cluster of servers executing the same software to collectively process requests as distributed by a front-end server and a load balancer. Server 140 is described in more detail with regard to the figures.

In the example embodiment, model 142 is a model, such as a machine learning model, that is capable of receiving an input and provide a corresponding output. For example, in one or more embodiments, model 142 may be capable of receiving an input corresponding to a goal and providing an output of a prediction corresponding to a next action to take (by the web crawler or another application) in order to achieve the goal. Furthermore, in the example embodiment, model 142 may function in a reinforced learning environment, and may further be capable of observing an environment, such as for example activity conducted by web crawler 112 and utilizing the observed activity to determine a prediction. In addition, in one or more embodiments, model 142 may require an input that is a fixed-length input, or a fixed-structure input. Model 142 is described in more detail with regard to the figures.

In the example embodiment, server 150 includes database 154. In the example embodiment, server 150 may be a desktop computer, a laptop computer, a tablet computer, a mobile device, a handheld device, a thin client, or any other electronic device or computing system capable of receiving and sending data to and from other computing devices, such as server 110, via network 130. Furthermore, in the example embodiment, server 150 is a computing device that is optimized for the support of database requests that correspond to database 154. Although not shown, optionally, server 150 can comprise a cluster of servers executing the same software to collectively process requests as distributed by a front-end server and a load balancer. Server 150 is described in more detail with regard to the figures.

In the example embodiment, database 154 is a database that includes information corresponding to one or more webpages. For example, database 154 may include information corresponding a web page visited by web crawler 112, such as HTML source code, one or more actionable elements extracted from the HTML source code, additional information corresponding to the web page (such as if a digital shopping cart is empty or has an item, etc.), and previous web pages that web crawler 112 has visited (and previous actions that web crawler 112 has taken). In other embodiments, database 154 may include user information or other types of information. Database 154 is described in more detail with regard to the figures.

In the example embodiment, server 110 includes web crawler 112, browser 114, autoencoder 116, and transformation program 118. In the example embodiment, server 110 may be a desktop computer, a laptop computer, a tablet computer, a mobile device, a handheld device, a thin client, or any other electronic device or computing system capable of receiving and sending data to and from other computing devices, such as web server 120, via network 130. Furthermore, in the example embodiment, server 110 is a computing device that is optimized for the support of programs that reside on server 110, such as web crawler 112, autoencoder 116, and transformation program 118. Although not shown, optionally, server 110 can comprise a cluster of servers executing the same software to collectively process requests as distributed by a front-end server and a load balancer. Server 110 is described in more detail with regard to the figures.

In the example embodiment, browser 114 is an application that is capable of communicating with other computing devices to transmit request and a receive information. Furthermore, browser 114 is capable of displaying received information to the user of server 110. In the example embodiment, browser 114 may transmit a request to website 122, and further receive webpage information from website 122. Browser 114 is described in further detail with regard to the figures.

Web crawler 112 is a software application that is capable of browsing the internet in order to identify information corresponding to one or more web pages, such as, to the identify elements of a web page. In the example embodiment, web crawler 112 is capable of accessing one or more databases to identify one or more websites that need to be analyzed (and is further capable of storing information in one or more databases in association with one or more web pages or websites). Additionally, in the example embodiment, web crawler 112 is capable of extracting information and content from a web page, such as for example, source code corresponding to one or more elements of a web page. Furthermore, in one or more embodiments, web crawler 112 may utilize the functionality of browser 114 to access one or more websites, such as website 122. Web crawler 112 is described in further detail with regard to the figures.

Furthermore, in one or more embodiments, web crawler 112 may utilize an application programming interface (API) in communicating with other programs, and further in communicating with database 154.

Autoencoder 116 includes encoder 116a and decoder 116b. In the example embodiment, autoencoder 116 is an RNN autoencoder, capable of leveraging RNN capabilities of processing sequential data. In other embodiments, autoencoder 116 may be leverage other neural network capabilities. In the example embodiment, autoencoder 116 is comprised of encoder 116a which is capable of transforming an input token sequence (corresponding to a variable length input, such as HTML) into a fixed length representation that is usable in machine learning models. Autoencoder 116 is also comprised of decoder 116b which is capable of transforming the fixed length representation back into the token sequence provided to encoder 116a. Autoencoder 116, encoder 116a, and decoder 116b is described in further detail with regard to the figures.

Transformation program 118 is a program capable of identifying actionable elements from within markup language (such as from HTML extracted by web crawler 112). Furthermore, in one or more embodiments, transformation program 118 is capable of utilizing markup language corresponding to one or more actionable elements to train and configure autoencoder 116 by adjusting weight values associated with autoencoder 116. In addition, in the example embodiment, transformation program 118 is capable of transforming the markup language corresponding to the identified actionable elements into one or more embedded tokens which may then be input into encoder 116a in order to create a fixed length vector representation. Furthermore, transformation program 118 is capable of inputting the fixed length vector representation into a model, such as model 142, and identifying an appropriate action or result based on the output of the model. The operations of transformation program 118 is described in further detail with regard to the figures.

In addition, although in the example embodiment, model 142 and database 154 are depicted as being on server 140 and server 150 respectively, in other embodiments, model 142 and/or database 154 may be located on a single server or may be located on server 110.

Figure 2:
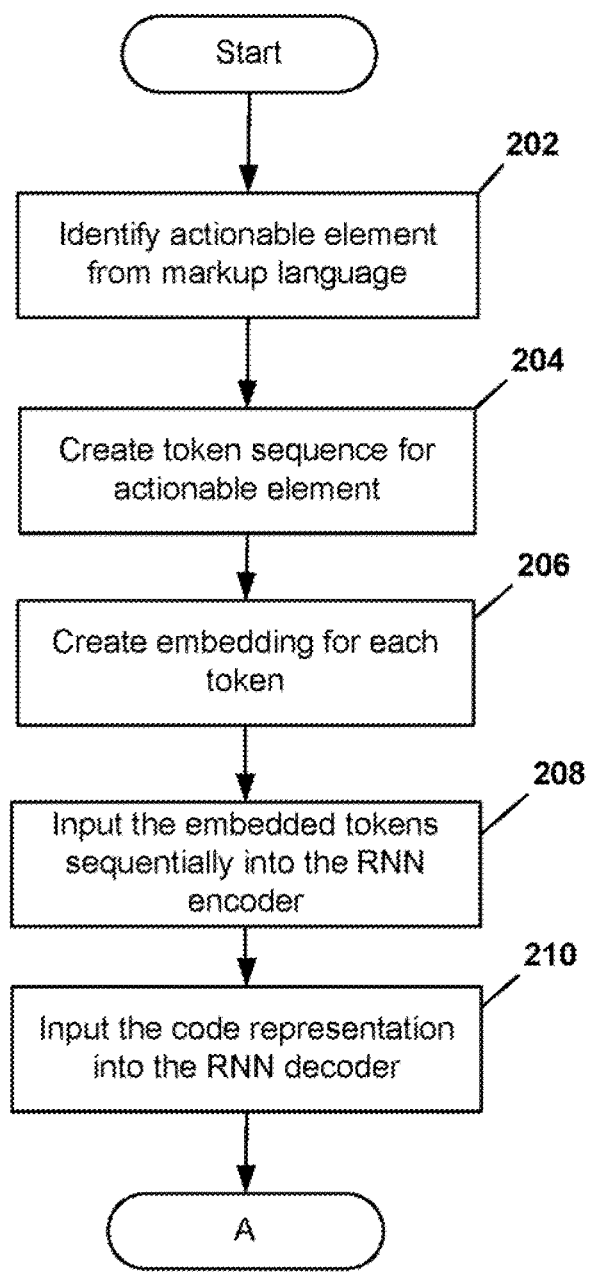
FIGS. 2 and 3 are a flowchart illustrating the operations of the transformation program of FIG. 1 in training the autoencoder of FIG. 1, in accordance with an embodiment.
Figure 3:
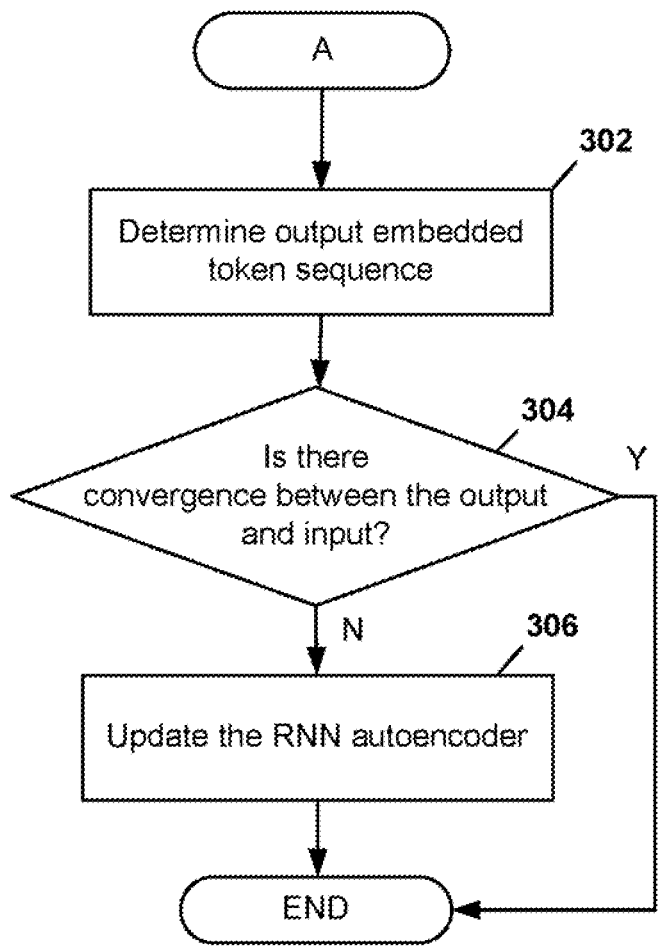

FIGS. 2 and 3 are a flowchart illustrating the operations of transformation program 118 in training (or calibrating) the autoencoder 116, in accordance with an embodiment. In the example embodiment, web crawler 112 extracts markup language (such as HTML, XML, etc.) from a webpage of website 122. In the example embodiment, web crawler 112 may access the web page by way utilizing the capabilities of browser 114.

In the example embodiment, transformation program 118 analyzes the extracted markup language and identifies the markup language that corresponds to an actionable element (step 202). In the example embodiment, markup language corresponding to an actionable element may include markup language associated with: a selected link and/or button, a field capable of accepting input (such as an address field on a form), a drop down menu, swipe areas, elements capable of being dragged, or any other element that corresponds to an action. In the example embodiment, transformation program 118 identifies the markup language that corresponds to an actionable element by analyzing the tags (such as HTML tags) within the markup language, and further identifying tags and the corresponding markup language that corresponds to an actionable element. For example, transformation program 118 may analyze the extracted markup language and identify an "<a>" tag, which typically corresponds to a hyperlink, and based on identifying the "<a>" tag may determine that the corresponding markup language, such as the attributes associated with the "<a>" tag (such as an "href" attribute that includes a hyperlink to a webpage) correspond to an actionable element.

In the example embodiment, transformation program 118 creates a token sequence that corresponds to the markup language associated with the actionable element (step 204). In the example embodiment, transformation program 118 may create a token sequence of the markup language corresponding to the actionable element by, for example, utilizing special predefined tokens to modify or replace certain portions of the markup language. For example, "<START>" may be a token that is utilized to mark the beginning of the sequence that makes up the token sequence, and "<END>" may be a token that is utilized to mark the end of the sequence. Furthermore, "<PAD>" may be a token that is utilized to act as a filler, "<DIGIT>" may be a token that is utilized to replace all digits, and "<SITE>" may a token utilized to replace the protocol and host portions of a uniform resource locator (URL). Referring to FIG. 5, two examples are shown that depict how transformation program 118 creates a token sequence from a markup language associated with an actionable element. Specifically, column 502 depicts two examples of markup language associated with actionable elements, and column 504 depicts a token sequence of the two portions of markup language. The token mapping described above is utilized by transformation program 118 in created the token sequence depicted in column 504, however, in other embodiments, a different token mapping may be utilized. Furthermore, in the example embodiment, a token sequence may have a predetermined set sequence length, and therefore, if a particular token sequence is larger than the predetermined set sequence length, the tokens at the end of the token sequence may be discarded until the set sequence length is achieved. Similarly, if a particular token sequence contains fewer tokens than the predetermined set sequence length, filler tokens (such as "<PAD>" tokens) may be added to the end of the token sequence until the set sequence length is achieved.

In the example embodiment, transformation program 118 creates an embedding for each token within the token sequence (step 206). In the example embodiment, transformation program 118 utilizes a "one hot encoding" method, however in other embodiments, a different embedding method may be utilized. In the example embodiment, transformation program 118 may create and maintain a mapping between one or more tokens and one or more assigned integers. For example, transformation program 118 may maintain a mapping of: "a"=1, "b"=2, "<"=3, and ">"=4. Therefore, transformation program 118 would transform the sequence of tokens "<a>" into [0, 0, 1, 0 . . . ], [1, 0, 0 . . . ], [0, 0, 0, 1 . . . ].

Transformation program 118 inputs the embedded tokens sequentially into encoder 116a (step 208). In the example embodiment, as stated above, encoder 116a is an RNN encoder that is capable of leverage the capabilities of RNN to process sequential data, however, in other embodiments, encoder 116a may be an encoder that leverages other neural network capabilities. In the example embodiment, encoder 116a produces a code representation of the embedded token sequence.

Transformation program 118 may then input the code representation into decoder 116b (step 210). In the example embodiment, as stated above, decoder 116b is an RNN decoder that is capable of leverage the capabilities of RNN. In the example embodiment, decoder 116b receives the input code representation and produces a series of probability vectors, with each probability vector including one or more token possibilities. Furthermore, in the example embodiment, transformation program 118 may analyze each probability vector and determine a token from the one or more token possibilities that corresponds to the highest probability or likelihood value. Utilizing this process, transformation program 118 may select a token from each probability vector to determine an output embedded token sequence.

In addition, based on the configuration of weight values associated with autoencoder 116, the output embedded token sequence may not be equivalent to the input embedded token sequence derived from the markup language associated with the actionable element. In order to determine what adjustments need to be made to the weight values associated with autoencoder 116, transformation program 118 compares the embedded token output by decoder 116b to the embedded token sequence input into encoder 116a to determine if there is a convergence between the output of decoder 116b and the input provided to encoder 116a (decision 304). In other words, transformation program 118 determines if the output of decoder 116b is substantially equivalent to the input of encoder 116a. In the example embodiment, this may include determining if the output embedded token sequence and the input embedded token sequence are equal or within a threshold percentage of being equal.

If transformation program 118 determines that there is a convergence between the output vectors of decoder 116b and the input vectors provided to encoder 116a (decision 304, "YES" branch), transformation program 118 determines that training is complete and no adjustments to the weight values associated with autoencoder 116 need to be made. If transformation program 118 determines that there is not a convergence between the output vectors of decoder 116b and the input vectors provided to encoder 116a (decision 304, "NO" branch), transformation program 118 updates the weight values associated with autoencoder 116 based on a determined loss value (step 306). In the example embodiment, transformation program 118 determines the loss value based on comparing the output token sequence (or the corresponding probability vectors) with the desired output token sequence, and based on the determined loss value, transformation program 118 updates the weight values associated with autoencoder 116. In the example embodiment, transformation program 118 utilizes the back-propagation algorithm to adjust the weight values, however, in other embodiments, other neural network training algorithms, or other types of algorithms may be utilized. Once the weight values have been adjusted, transformation program 118 may repeat the process described in FIGS. 2 and 3 until there is a convergence between the output vectors of decoder 116b and the input vectors provided to encoder 116a.

In one or more embodiments, the output embedded token sequence may further be transformed into a token sequence, by utilizing the mapping maintained by transformation program 118. For example, referring once again to FIG. 5, column 506 depicts a token sequence that has been reconstructed by utilizing decoder 116b. Furthermore, in these one or more embodiments, rather than comparing the output embedded token sequence to the input embedded token sequence, transformation program 118 may compare the output token sequence to the input token sequence.

Figure 4:
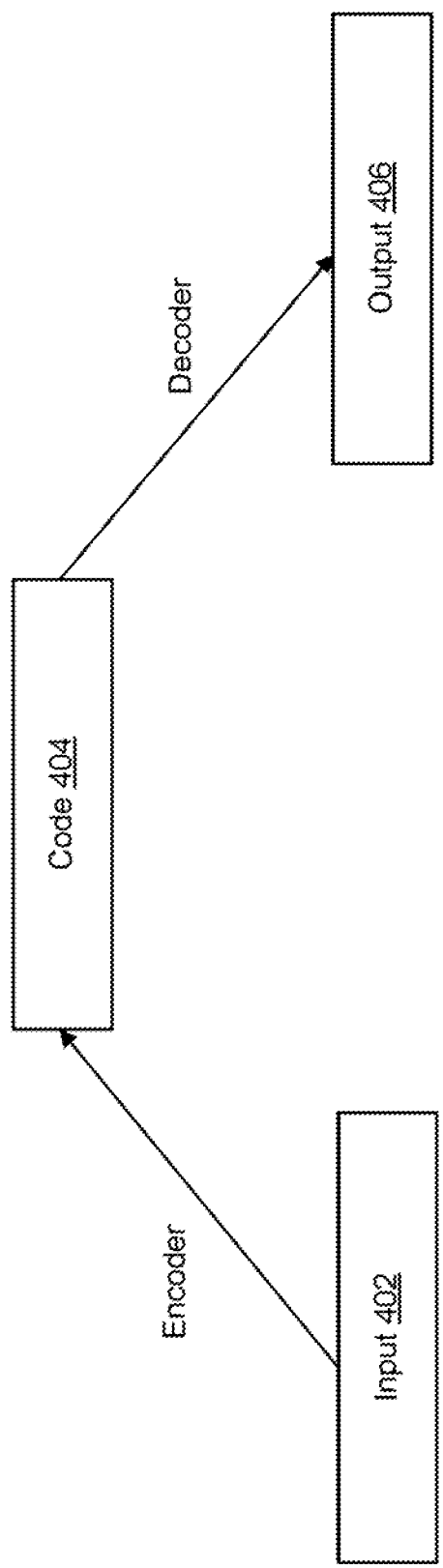
FIG. 4 is a flow diagram illustrating the process for training the autoencoder of FIG. 1, in accordance with an embodiment.

FIG. 4 is a flow diagram illustrating the process for training autoencoder 116, in accordance with an embodiment. In the example embodiment, as described above, transformation program 118 inputs an embedded token sequence corresponding to markup language associated with an actionable element (i.e. input 402) into encoder 116a which results in a code representation, code 404. Transformation program 118 may then input the code representation into decoder 116b resulting in an embedded token sequence referred to as output 406. Transformation program 118 may then compare output 406 to input 402, in the manner described above, in order to determine if there is a convergence between output 406 and input 402. Transformation program 118 may repeat this process iteratively with the additional inputs until a convergence between output 406 and input 402 has been achieved.

FIG. 5 is a depiction of specific iterations of the process of training autoencoder 116, in accordance with an embodiment. In the example embodiment, FIG. 5 depicts a markup language 502, which may include markup language corresponding to an actionable element, a token sequence 504 corresponding to the markup language, and an output token sequence 506, corresponding to a token sequence output by decoder 116b. As shown, the output token sequence 506 may not be equivalent to the input token sequence 504, and therefore, transformation program 118 may adjust the weight values associated with autoencoder 116 until a convergence between the output and input is achieved.

Figure 6:
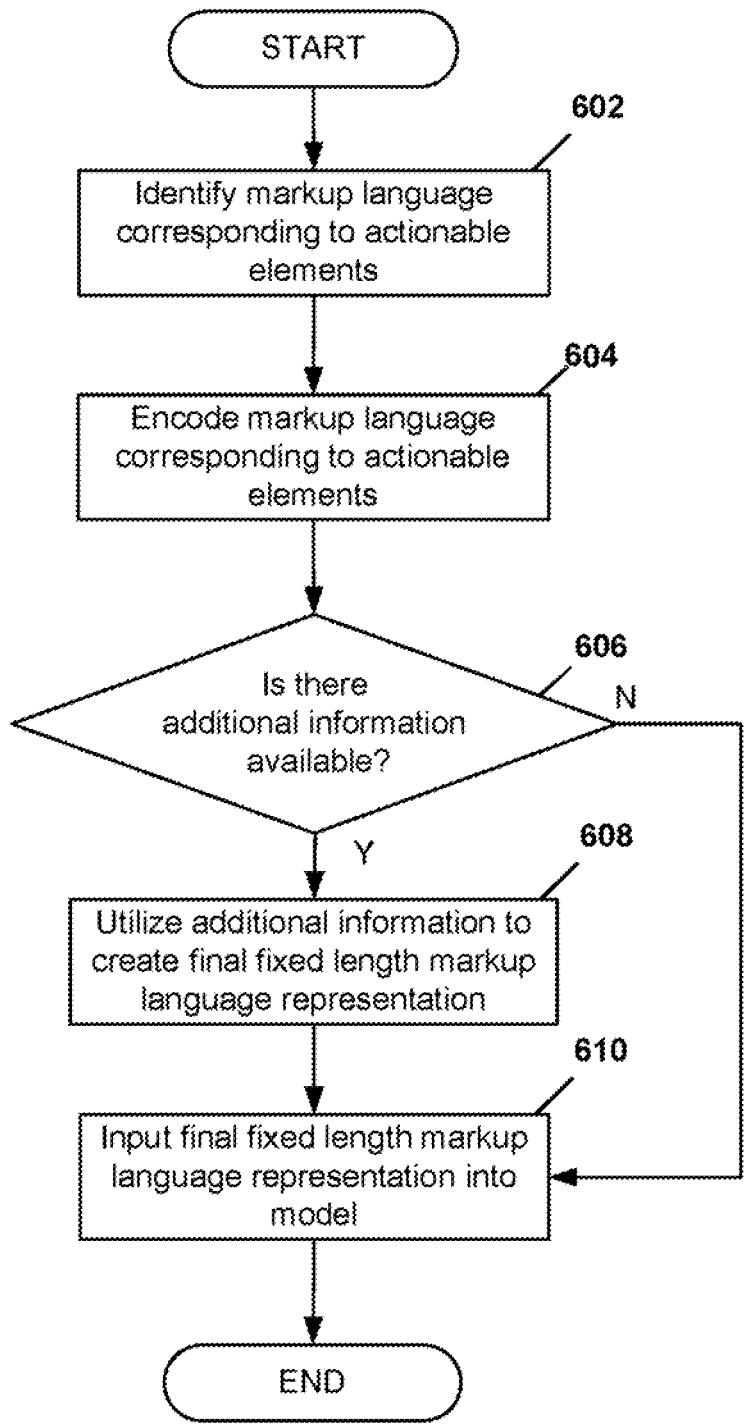
FIG. 6 is a flowchart illustrating the operations of the transformation program of FIG. 1 in utilizing the autoencoder of FIG. 1, after training, to create a fixed length representation from a variable length markup language snippet, in accordance with an embodiment.

FIG. 6 is a flowchart illustrating the operations of the transformation program of FIG. 1 in utilizing the autoencoder of FIG. 1, after training, to create a fixed length representation from a variable length markup language snippet, in accordance with an embodiment. As stated above, web crawler 112 may utilize the capabilities of browser 114 to extract markup language (such as HTML, XML, etc.) from a webpage of website 122.

In the example embodiment, transformation program 118 analyzes the extracted markup language and identifies the markup language that corresponds to an actionable element (step 602). As stated above, in the example embodiment, markup language corresponding to an actionable element may include markup language associated with: a selected link and/or button, a field capable of accepting input (such as an address field on a form), a drop down menu, swipe areas, elements capable of being dragged, or any other element that corresponds to an action. In the example embodiment, transformation program 118 identifies the markup language that corresponds to an actionable element by analyzing the tags (such as HTML tags) within the markup language, and further identifying tags and the corresponding markup language that corresponds to an actionable element.

In the example embodiment, as stated above, transformation program 118 creates a token sequence that corresponds to the markup language associated with the actionable element. In the example embodiment, transformation program 118 may create a token sequence of the markup language corresponding to the actionable element by, for example, utilizing special predefined tokens to modify or replace certain portions of the markup language. Furthermore, in the example embodiment, a token sequence may have a predetermined set sequence length, and therefore, if a particular token sequence is larger than the predetermined set sequence length, the tokens at the end of the token sequence may be discarded until the set sequence length is achieved. Similarly, if a particular token sequence contains fewer tokens than the predetermined set sequence length, filler tokens (such as "<PAD>" tokens) may be added to the end of the token sequence until the set sequence length is achieved. In addition, as stated above, transformation program 118 may further create an embedding for each token within the token sequence. In the example embodiment, transformation program 118 utilizes a "one hot encoding" method, however in other embodiments, a different embedding method may be utilized.

Transformation program 118 inputs the embedded tokens sequentially into encoder 116a (step 604). In the example embodiment, as stated above, encoder 116a is an RNN encoder that is capable of leverage the capabilities of RNN to process sequential data, however, in other embodiments, encoder 116a may be an encoder that leverages other neural network capabilities. In the example embodiment, encoder 116a produces a code representation of the embedded token sequence.

Transformation program 118 may determine if additional information corresponding to the overall goal of web crawler 112 is available (decision 606). In the example embodiment, web crawler 112 may have a specific goal, such as for example, accessing a checkout page of a website 122. Therefore, for the goal of accessing the checkout page, an administrator may define specific information or determinations that may be usable by the model in achieving the goal of accessing the checkout page of website 122. For example, "Has an item been added to the digital shopping cart?", or "Did we identify the cart element on the visible webpage?" may be specific determinations defined for the purpose of accessing the checkout page of website 122. Transformation program 118 may analyze the source code corresponding to the current web page (or web pages accessed during the current session) and/or access database 154 to analyze the previous crawling activity conducted by web crawler 112 in order to determine the relevant information/answers for the specific determinations. For example, transformation program 118 may analyze the previous crawling activity and determine that web crawler 112 has taken steps to add an item to the digital shopping cart of website 122 during the current session. The additional information may also include other types of information, such as the number of web pages that have been visited in the current session, and other features related to the process and/or goal associated with web crawler 112. The additional information corresponding to the specific determinations may be usable by model 142 in determining what the appropriate next step to take should be. For example, if transformation program 118 determines that an item has not been added to the digital shopping cart (with the goal being to access the checkout page), model 142 may instruct web crawler 112 to take the appropriate steps to add an item to the digital shopping cart.

If transformation program 118 determines there is no additional information available (decision 606, "NO" branch), transformation program 118 utilizes the code representation as the final fixed length markup language representation corresponding to the actionable element and further inputs the code representation into model 142 (step 610). If transformation program 118 determines that there is additional information available (decision 606, "YES" branch), transformation program 118 creates a final fixed length markup language representation from the code representation and the identified additional information (step 608) and further inputs the created final fixed length markup language representation into model 142 (step 610). In the example embodiment, the identified additional information may be concatenated to the code representation to the create the final fixed length markup language. Furthermore, in the example embodiment, the model may be a machine learning model and may further process the input information and identify a next step for web crawler 112 to take based on the provided input and the pre-set goal. For example, if the pre-set goal is to access the checkout page, model 142 may output a recommendation to take an action that results in adding an item to a digital shopping cart.

As stated above, model 142 may be a machine learning model functioning in a reinforced learning environment.

Figure 7:
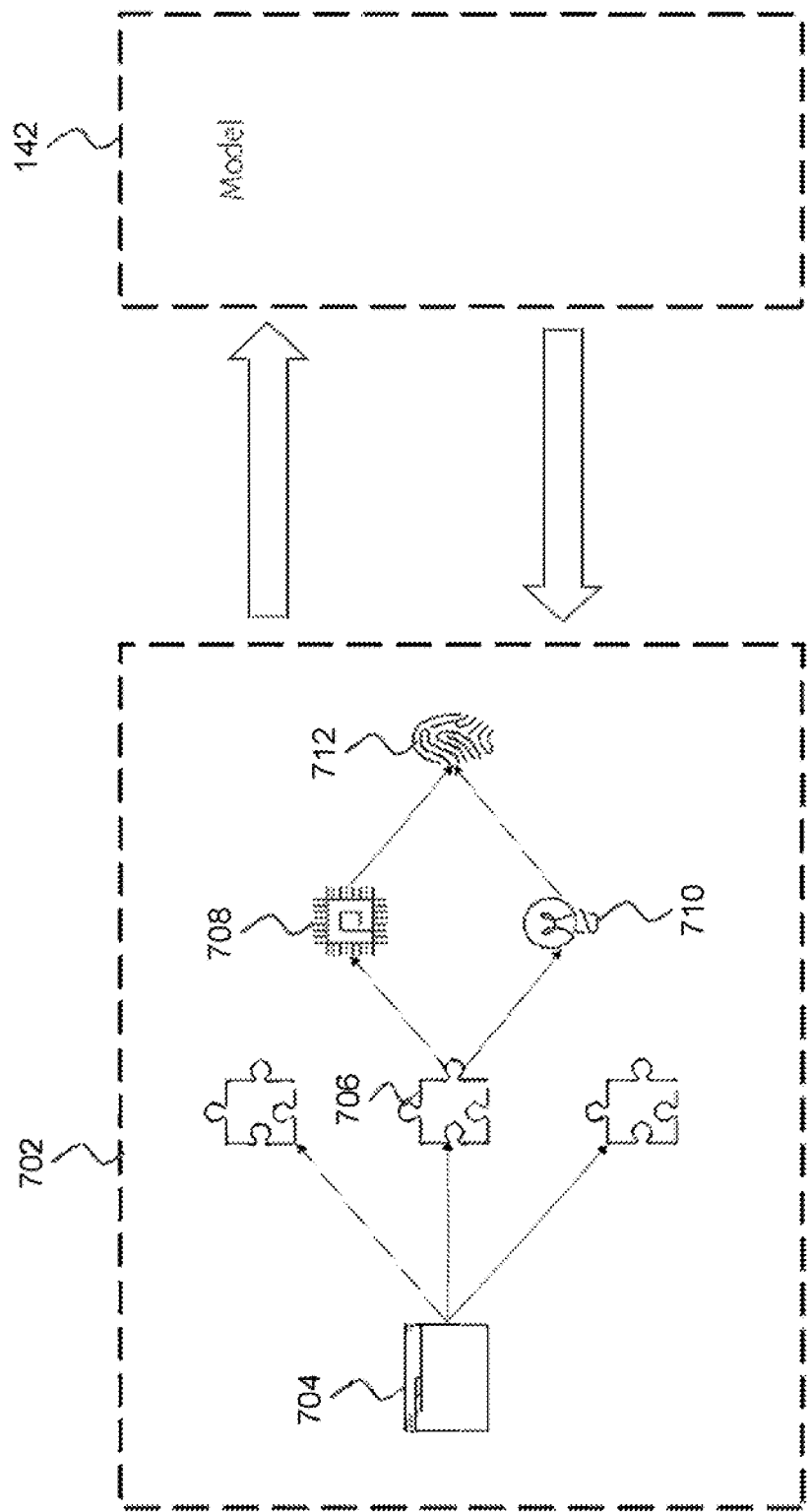
FIG. 7 is a flow diagram illustrating the process of creating a fixed length representation from a variable length markup language snippet for input into the model of FIG. 1, in accordance with an embodiment.

FIG. 7 is a flow diagram illustrating the process of creating a fixed length representation from a variable length markup language snippet for input into model 142, in accordance with an embodiment. In the example embodiment, FIG. 7 represents a reinforced learning system that includes an environment, environment 702, and a model, model 142, that observes environment 702 and, based on received input, provides predictions/recommendations as to what action to take to efficiently achieve a pre-set goal. In the example embodiment, as stated above, transformation program 118 analyzes markup language extracted from web content 704 and further identifies markup language 706 that corresponds to an actionable element. Transformation program 118 then inputs processes the markup language, as described above, to create a corresponding embedded token sequence which is input into encoder 116a to produce code representation 708. Transformation program 118 then determines if there is additional information corresponding to the pre-set goal, and if additional information, such as additional information 710, is identified, combines the additional information with code representation 708 to create final fixed length markup language representation 712. Transformation program 118 inputs final fixed length markup language representation 712 into model 142, with model 142 processing the input and providing information as to the next step to be taken in order to efficiently achieve the pre-set goal.

For example, the pre-set goal is to access a check-out page of a website, web crawler 112 may utilize the capabilities of browser 114 to extract markup language (such as HTML) from a webpage of website 122. Transformation program 118 may then identify actionable items corresponding to the extracted markup language and further utilize one or more techniques (such as the techniques described above) to provide a representation corresponding to each of the actionable items, which may include additional information such as previous actions that have been taken by web crawler 112. Transformation program 118 may then provide the representation of each actionable item to model 142, which may then analyze the representation and determine, based on the goal to be achieved, if an action is required with respect to the actionable item, and further what action that web crawler 112 should take. For example, if the actionable item corresponds to adding an item to a digital cart, the model 142 may analyze additional information corresponding to whether an item is already present in the digital cart, and based on the analysis determine whether or not web crawler 112 should select the actionable item (therefore adding the item to the digital cart). Furthermore, if via analysis of the additional information, model 142 determines that an item is already present in the digital cart, model 142 may determine that an action does not need to be taken with regard to the actionable item corresponding to adding an item to the digital cart because the pre-defined goal of accessing the checkout page does not require the action to be taken. In other words, since model 142 is working within a reinforced learning environment, a reward may be offered based on how efficient the model achieves the pre-defined goal. Therefore, adding an item to a digital cart when an item is already present in the digital cart may be viewed by model 142 as an unnecessary and inefficient task. However, if via analysis of the additional information, model 142 determines that an item is not present in the digital cart, model 142 may determine/recommend that web crawler 112 select the aforementioned actionable item corresponding to adding the item to the digital cart.

Furthermore, the pre-defined goal of reaching the checkout page is offered as an example, and the process described above may be utilized for achieving other goals such as a know your customer (kyc) process in which the goal may be to identify and/or verify information corresponding to a customer.

In one or more embodiments, the reinforced learning system described in FIG. 7 may receive an input corresponding to a representation of an environment and based on the representation of the environment may decide an action to take in order to efficiently achieve a goal. While in the example embodiment the representation of the environment may be presented as final fixed length markup language representation 712, formulated using the process described above, in other embodiments, the representation of the environment may be formulated using other methodologies.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 8:
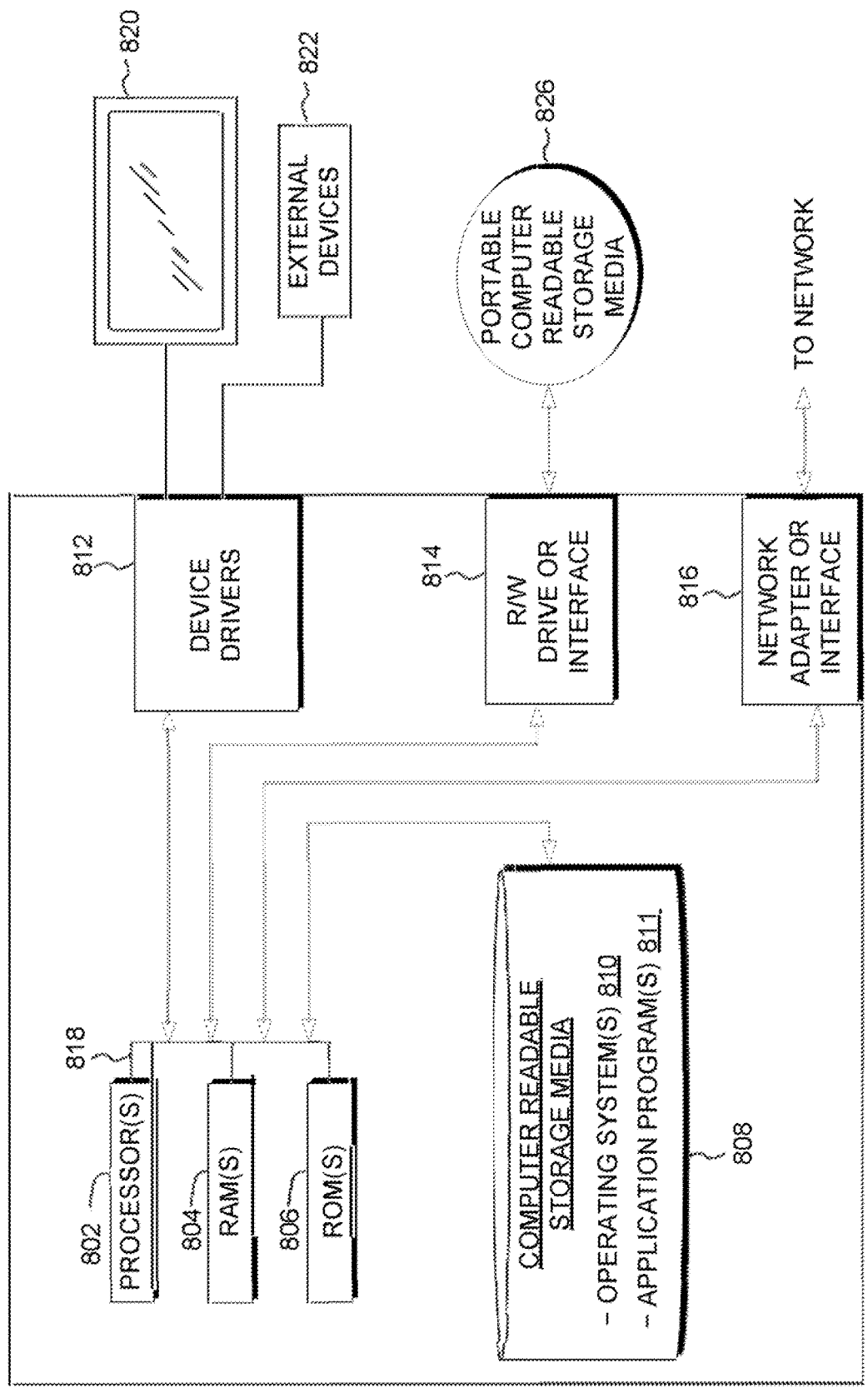
FIG. 8 is a block diagram depicting the hardware components of the autoencoder system of FIG. 1, in accordance with an embodiment.

FIG. 8 depicts a block diagram of components of computing devices contained in autoencoder system 100 of FIG. 1, in accordance with an embodiment. It should be appreciated that FIG. 8 provides only an illustration of one implementation and does not imply any limitations with regard to the environments in which different embodiments may be implemented. Many modifications to the depicted environment may be made.

Computing devices may include one or more processors 802, one or more computer-readable RAMs 804, one or more computer-readable ROMs 806, one or more computer readable storage media 808, device drivers 812, read/write drive or interface 814, network adapter or interface 816, all interconnected over a communications fabric 818. Communications fabric 818 may be implemented with any architecture designed for passing data and/or control information between processors (such as microprocessors, communications and network processors, etc.), system memory, peripheral devices, and any other hardware components within a system.

One or more operating systems 810, and one or more application programs 811, for example, web crawler 112, are stored on one or more of the computer readable storage media 808 for execution by one or more of the processors 802 and by utilizing one or more of the respective RAMs 804 (which typically include cache memory). In the illustrated embodiment, each of the computer readable storage media 808 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 814 to read from and write to one or more portable computer readable storage media 826. Application programs 811 on the computing devices may be stored on one or more of the portable computer readable storage media 826, read via the respective R/W drive or interface 814 and loaded into the respective computer readable storage media 808.

Computing devices may also include a network adapter or interface 816, such as a TCP/IP adapter card or wireless communication adapter (such as a 4G wireless communication adapter using OFDMA technology). Application programs 811 on the computing devices may be downloaded to the computing devices from an external computer or external storage device via a network (for example, the Internet, a local area network or other wide area network or wireless network) and network adapter or interface 816. From the network adapter or interface 816, the programs may be loaded onto computer readable storage media 808. The network may comprise copper wires, optical fibers, wireless transmission, routers, firewalls, switches, gateway computers and/or edge servers.

Computing devices may also include a display screen 820, and external devices 822, which may include, for example a keyboard, a computer mouse and/or touchpad. Device drivers 812 interface to display screen 820 for imaging, to external devices 822, and/or to display screen 820 for pressure sensing of alphanumeric character entry and user selections. The device drivers 812, R/W drive or interface 814 and network adapter or interface 816 may comprise hardware and software (stored on computer readable storage media 808 and/or ROM 806).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure.

Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system, comprising:
one or more processors, one or more computer-readable memories, with program instructions stored on the one or more computer-readable memories, the one or more processors configured to execute the program instructions to cause the system to perform operations comprising:
identifying a pre-set goal corresponding to a website;
determining that a first portion of a markup language associated with the website corresponds to a first actionable element, wherein the first portion of the markup language is a variable length representation;
in response to determining that the first portion of the markup language corresponds to the first actionable element, creating a fixed length representation of the first actionable element, wherein the fixed length representation of the first actionable element corresponds to the first portion of the markup language and includes a first additional information associated with the pre-set goal;
inputting the fixed length representation of the first actionable element into a model; and
determining, based on an output provided by the model, whether to utilize a web crawler to select the first actionable element, wherein selecting the first actionable element causes a first action to be taken.

2. The system of claim 1, wherein the determining whether to utilize the web crawler to select the first actionable element further comprises analyzing the first additional information to determine one or more previous actions taken by the web crawler.

3. The system of claim 2, wherein the determining whether to utilize the web crawler to select the first actionable element further comprises determining whether the first actionable element corresponds to one or more actions associated with the pre-set goal.

4. The system of claim 1, the operations further comprising:
in response to determining to utilize a web crawler to select the first actionable element, determining a reward to provide a reinforcement learning agent of the system, wherein the reward corresponds to an action caused by the selection of the first actionable element.

5. The system of claim 1, wherein the pre-set goal is to access a checkout page, wherein the first actionable element corresponds to adding a first item to a digital cart, and wherein the operations further comprise:
in response to determining, based on analyzing the first additional information, that the digital cart contains an item, determining to not utilize the web crawler to select the first actionable element.

6. The system of claim 1, wherein the creating the fixed length representation of the first actionable element includes utilizing a recurrent neural network (RNN) encoder to create a first code representation that corresponds to the first markup language.

7. The system of claim 1, wherein the model is a reinforcement learning model.

8. A method comprising:
identifying a pre-set goal corresponding to a website;
determining that a first portion of a markup language associated with the website corresponds to a first actionable element, wherein the first portion of the markup language is a variable length representation;
in response to determining that the first portion of the markup language corresponds to the first actionable element, creating a fixed length representation of the first actionable element, wherein the fixed length representation of the first actionable element corresponds to the first portion of the markup language and includes a first additional information associated with the pre-set goal;
inputting the fixed length representation of the first actionable element into a model; and
determining, based on an output provided by the model, whether to utilize a web crawler to select the first actionable element, wherein selecting the first actionable element causes a first action to be taken.

9. The method of claim 8, wherein the determining whether to utilize the web crawler to select the first actionable element further comprises analyzing the first additional information to determine one or more previous actions taken by the web crawler.

10. The method of claim 9, wherein the determining whether to utilize the web crawler to select the first actionable element further comprises determining whether the first actionable element corresponds to one or more actions associated with the pre-set goal.

11. The method of claim 8, further comprising:
in response to determining to utilize a web crawler to select the first actionable element, determining a reward to provide a reinforcement learning agent, wherein the reward corresponds to an action caused by the selection of the first actionable element.

12. The method of claim 8, wherein the pre-set goal is to access a checkout page, wherein the first actionable element corresponds to adding a first item to a digital cart, and wherein the method further comprises:
in response to determining, based on analyzing the first additional information, that the digital cart contains an item, determining to not utilize the web crawler to select the first actionable element.

13. The method of claim 8, wherein the creating the fixed length representation of the first actionable element includes utilizing a recurrent neural network (RNN) encoder to create a first code representation that corresponds to the first markup language.

14. The method of claim 8, wherein the model is a reinforcement learning model.

15. A non-transitory machine-readable medium having stored thereon machine-readable instructions executable to cause a machine to perform operations comprising:
identifying a pre-set goal corresponding to a website;
determining that a first portion of a markup language associated with the website corresponds to a first actionable element, wherein the first portion of the markup language is a variable length representation;
in response to determining that the first portion of the markup language corresponds to the first actionable element, creating a fixed length representation of the first actionable element, wherein the fixed length representation of the first actionable element corresponds to the first portion of the markup language and includes a first additional information associated with the pre-set goal;
inputting the fixed length representation of the first actionable element into a model; and
determining, based on an output provided by the model, whether to utilize a web crawler to select the first actionable element, wherein selecting the first actionable element causes a first action to be taken.

16. The non-transitory machine-readable medium of claim 15, wherein the determining whether to utilize the web crawler to select the first actionable element further comprises analyzing the first additional information to determine one or more previous actions taken by the web crawler.

17. The non-transitory machine-readable medium of claim 16, wherein the determining whether to utilize the web crawler to select the first actionable element further comprises determining whether the first actionable element corresponds to one or more actions associated with the pre-set goal.

18. The non-transitory machine-readable medium of claim 15, the operations further comprising:
- in response to determining to utilize a web crawler to select the first actionable element, determining a reward to provide a reinforcement learning agent, wherein the reward corresponds to an action caused by the selection of the first actionable element.

19. The non-transitory machine-readable medium of claim 15, wherein the pre-set goal is to access a checkout page, wherein the first actionable element corresponds to adding a first item to a digital cart, and wherein the operations further comprise:
- in response to determining, based on analyzing the first additional information, that the digital cart contains an item, determining to not utilize the web crawler to select the first actionable element.

20. The non-transitory machine-readable medium of claim 15, wherein the creating the fixed length representation of the first actionable element includes utilizing a recurrent neural network (RNN) encoder to create a first code representation that corresponds to the first markup language.

\* \* \* \* \*